P. OKEY.
GOVERNOR FOR REGULATING THE OVERCHARGE FOR STORAGE BATTERIES.
APPLICATION FILED OCT. 11, 1916.

1,240,590.

Patented Sept. 18, 1917.

Witness
Inventor
Perry Okey
By
Attorney

UNITED STATES PATENT OFFICE.

PERRY OKEY, OF COLUMBUS, OHIO, ASSIGNOR, BY MESNE ASSIGNMENTS, TO LALLEY ELECTRO-LIGHTING CORPORATION, OF DETROIT, MICHIGAN, A CORPORATION OF NEW YORK.

GOVERNOR FOR REGULATING THE OVERCHARGE FOR STORAGE BATTERIES.

1,240,590. Specification of Letters Patent. Patented Sept. 18, 1917.

Application filed October 11, 1916. Serial No. 124,960.

*To all whom it may concern:*

Be it known that I, PERRY OKEY, a citizen of the United States, residing at Columbus, in the county of Franklin and State of Ohio, have invented certain new and useful Improvements in Governors for Regulating the Overcharge for Storage Batteries, of which the following is a specification.

This invention relates to governors for regulating the over-charge for storage batteries and, as is obvious, resides in a structure whereby a storage battery may be periodically and also automatically given an over-charge for each complete cycle of full charge. It is well known that, to obtain the highest efficiency from a storage battery, it should be frequently given an over-charge so that its plates will be kept in the best of condition.

My invention, therefore, has for its primary object the provision of mechanism whereby the controlling means between the storage battery and generator is so constructed and arranged that an over charge is periodically and also automatically given the battery for each complete cycle of full charge, the number of full charges desired being of no importance to the present invention, but may be regulated to suit the taste of the individual user. A further improvement of my invention also resides in the combination of a generator and storage battery with an ampere hour meter, which latter coöperates with a structure whereby the battery is periodically given an over charge although the ampere hour meter registers merely a full charge.

Figure 1:
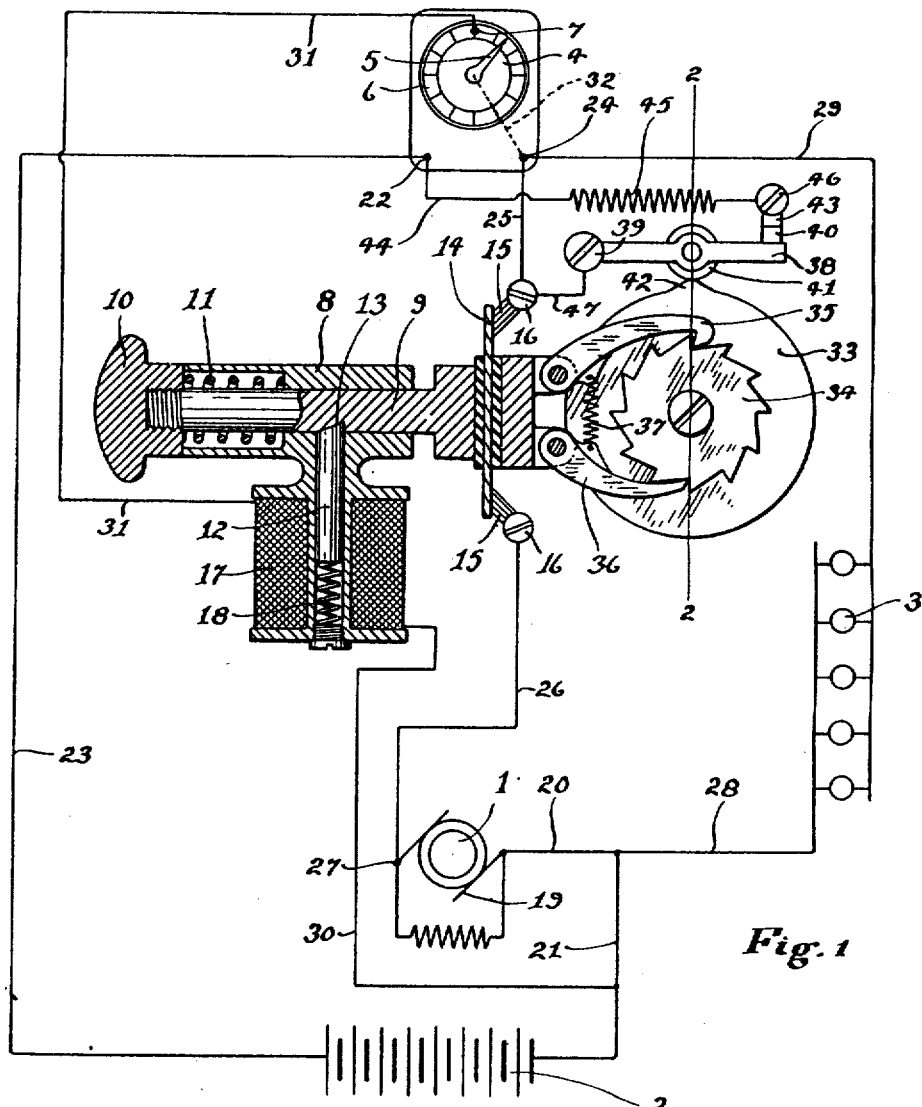
Figure 2:
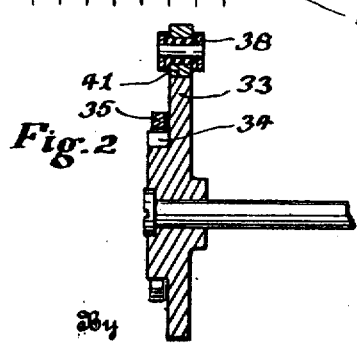

Further objects of my invention reside in the structure and arrangement shown in the accompanying sheets of drawings, wherein similar characters of reference designate corresponding parts, and wherein:

Figure 1 is a view showing my improved governor structure in somewhat diagrammatic form, and, Fig. 2 is a section taken on line 2—2 of Fig. 1.

In these drawings, the generator or dynamo is designated by the reference numeral 1, the storage battery by the reference numeral 2, the work circuit or load by the reference numeral 3, and the ampere hour meter by the numeral 4. This ampere hour meter is of a well known construction and generally speaking, it is constructed so that the current taken from the storage battery causes the indicator finger 5 to play over the dial 6 in one direction, but when current is supplied the battery from the generator 1, this indicator plays over the dial in the opposite direction. Also, by means of the contact 7, a circuit is established each time the indicator engages the same to automatically break the charging circuit. This is accomplished by means of the circuit breaker shown in cross section in Fig. 1 and comprising a supporting member 8, within which the movable element 9 is slidably mounted. This movable element is designed to be moved in one direction by pressure upon the knob 10 and in the other direction by the action of the spring 11 bearing at one end upon the knob and at the other end upon the supporting member 11, this spring being operable each time the latch member 12 is withdrawn from its socket 13 in the movable element. The outer end of the movable element is provided with a contact member 14 which coöperates with a pair of suitable brushes 15 whereby, when the contact 14 and brushes 15 are in engagement, a circuit is made across the terminals 16. A magnet 17 is provided which, when energized, operates against the tension of the spring shown at 18 to withdraw the latch member 12 to thereby release the movable element 9 of the circuit breaker and consequently break the circuit across the brushes 15. As shown in the drawings, this circuit breaker is closed and consequently the battery 2 is being charged. When in this position, the generator causes current to flow from the positive brush 19 through the wires 20 and 21, through the battery 2, thence to the binding post 22 of the ampere hour meter by way of the wire 23, through the ampere hour meter to cause the indicator 5 to register the amount of current being passed, thence out through the binding post 24, wire 25, brushes 16 and contact plate 14, and wire 26 to the negative terminal 27 of the generator. Should the external load be applied during this time, a portion of this current may also be shunted from the wire 20 by means of the wire 28, through the lamps or load 3 into the wire 29 and return to the negative side of the generator through the binding post 24, wire 25, and brushes 15.

As soon as the indicator has made the required revolution to come into engagement with the contact 7, a circuit will be shunted off the generator through the wire 30, through the magnet 17, wire 31, contact 7, indicator 5, wire 32 and thence to the negative seat of the generator through the wire 25, brushes 15 and wire 26. This causes the magnet to be energized whereby the latch member 13 is retracted, thus breaking the electric circuit across the brushes 15 and thereby throwing the charging load off the generator. It will be understood that during the discharge of the battery, current passes from the positive terminal through the wires 21 and 28 to the load circuit 3 and returns by way of the wire 29 through the ampere hour meter and wire 23. It will thus be apparent that each time the battery has been discharged, the operator closes the circuit breaker and sets the generator into operation. This generator will cause the passage of the current through the battery until the indicator finger comes into engagement with the contact 7, whereupon the charging circuit is automatically broken.

To automatically cause a periodic overcharge, I have provided a structure whereby a portion of the charging current is prevented from passing through the ampere hour meter, although the entire current passes through the battery 2. In this manner, it takes the indicator finger 5 longer to make the required revolution to automatically break the charging circuit than necessary and in this manner the over-charge is obtained. This structure is represented by the cam 33 rigidly carrying the ratchet wheel 34. This ratchet wheel is designed to coöperate with a pair of pawls 35 and 36 pivotally mounted on the end of the movable element 9 of the circuit breaker and normally urged toward each other by means of the spring shown at 37. This cam 33 is designed to coöperate with a supplemental switch member comprising an arm 38 pivoted to the binding post 39 and carrying a contact piece 40 at its outer end. Intermediate its two ends this arm rotatably carries the roller shown at 41, which roller is so arranged that when the hump 42 of the cam engages it, the contact 40 on the outer end of the arm comes into electrical contact with the contact shown at 43 to thereby establish a shunt circuit around the ampere hour meter from the terminal 22, through the wire 44, resistance 45, binding post 46, contacts 43 and 40, arm 38, binding post 39, wire 47, brushes 15, and then to the generator, as has already been described. The preferred arrangement is one wherein the number of teeth on the ratchet wheel 34 is equal to the number of full charges constituting each cycle plus one, and the movement of the movable element of the circuit breaker is such that when it moves toward the left, the pawl 35 moves the ratchet a distance equaling half the circular pitch of the ratchet and upon movement in the other direction, the pawl 35 moves this same ratchet a corresponding distance, so that complete opening and closing movement of the circuit breaker will move the ratchet wheel and consequently the cam the distance of one tooth. It will, therefore, appear that after each complete cycle of full charges, an overcharge is given the battery, because when the hump 42 engages the roller 41, the shunt circuit around the ampere hour meter is closed. Therefore, a portion of the charging current only passes through the ampere hour meter and the remainder through this shunt circuit, the strength of the overcharge being regulated by the value of the resistance 45. Therefore, it will take the indicator finger 5 a longer period of time to come into engagement with the contact 7 than when the entire current passes through the meter, but when this indicator does come into engagement with the contact 7, the circuit breaker will be automatically opened as previously related.

From the foregoing description, it will be apparent that I have provided a structure wherein the battery will be periodically and also automatically given an over-charge once for each complete cycle of full charges. As related, the amount of this over-charge is regulated by the value of the resistance 45 and this over-charge mechanism is automatically rendered effective by the normal opening and closing of the circuit breaker to couple and uncouple the storage battery and generator.

What I claim is:

1. The combination with a storage battery and a generator, of means for automatically uncoupling the generator from the battery when the battery has received full charge, and means for automatically giving said battery an over-charge after each given number of full charges.

2. The combination with a storage battery and a generator, of means for automatically uncoupling the generator from the battery when the battery has received full charge, and means automatically operable to suspend the operation of said last named means periodically during each cycle of normal charges.

3. The combination with a storage battery and a generator, of an ampere hour meter, means coöperating with said meter for automatically uncoupling the generator from the battery when said meter registers a predetermined amount of current, and means whereby a portion of the current normally passing through said meter when the battery is charging may be diverted.

4. The combination with a storage battery and a generator, of an ampere hour meter, means coöperating with said meter for automatically uncoupling the generator from the battery when said meter registers a predetermined amount of current, and means for automatically decreasing the amount of current passing through said meter once out of each cycle of normal charges to give an over-charge.

5. The combination with a storage battery and a generator, of an ampere hour meter, means coöperating with said meter for automatically uncoupling the generator from said battery when said meter registers a predetermined amount of current, and means for automatically shunting a portion of the normal current around said meter once out of each cycle of normal charges to give an over-charge.

6. The combination with a storage battery and a generator, of an ampere hour meter, a switch mechanism operable when in one position to couple said generator with said battery and when in the other position to uncouple them, and means rendered operable by the opening and closing movement of said switch for automatically decreasing the current passing through said meter once out of each cycle of normal charges to give an over-charge.

7. The combination with a storage battery and a generator, of a switch mechanism for coupling said generator to said battery and operable to automatically break said coupling connection when full charge is reached, and means automatically operable once out of each cycle of full charges to prevent breaking of said coupling connection until an over-charge is given said battery.

8. The combination with a storage battery and a generator, of a switch mechanism for coupling said generator to said battery and operable to automatically break said coupling connection when full charge is reached, and means operated by the opening and closing movement of said switch and operable once out of each cycle of full charges to prevent breaking of said coupling connection until an over-charge is given said battery.

9. The combination with a storage battery and a generator, of an ampere hour meter, a switch mechanism operable when in one position to couple said generator with said battery and when in the other position to uncouple them, an electric circuit passing around said meter, a supplemental switch in said circuit, and means rendered operable once out of each cycle of full charges and by the opening and closing movement of said first named switch to close said supplemental switch to give an over-charge.

10. The combination with a storage battery and a generator, of an ampere hour meter, a switch mechanism operable when in one position to couple said generator and said battery and when in the other position to uncouple them, an electric circuit passing around said meter, a supplemental switch in said circuit, a cam structure coöperatively connected with respect to said last named switch, and means for giving said cam a partial revolution each time said first named switch is opened and closed to bring the hump of the cam into engagement with said second named switch to close said circuit once out of each cycle of full charges to give an over-charge.

11. The combination with a storage battery and a generator, of an ampere hour meter, a switch mechanism operable when in one position to couple said generator and said battery and when in the other position to uncouple them, an electric circuit passing around said meter, a supplemental switch in said circuit, a cam structure coöperatively mounted with respect to said last named switch, a ratchet wheel on said cam, and a pawl structure carried by said first named switch and operable to coöperate with said ratchet each time said first named switch is opened and closed to bring the hump of the cam into engagement with said second named switch to close said circuit once out of each cycle of full charges to give an over-charge.

12. The combination with a storage battery and a generator, of an ampere hour meter, a switch mechanism operable when in one position to couple said generator and said battery and when in the other position to uncouple them, an electric circuit passing around said meter, a supplemental switch in said circuit, a cam structure coöperatively mounted with respect to said last named switch, a ratchet wheel on said cam having teeth equaling the number of full charges desired plus one, a pair of pawls carried by said first named switch, one of which is operable to move the ratchet the distance of one-half tooth when its switch is closed and the other of which is operable to give the ratchet a similar movement when the switch is opened whereby to bring the hump of the cam into engagement with said second named switch to close said circuit once out of each cycle of full charges to give an over-charge.

In testimony whereof I affix my signature in presence of two witnesses.

PERRY OKEY.

Witnesses:
 WALTER E. L. BOCK,
 A. L. PHELPS.

Copies of this patent may be obtained for five cents each, by addressing the "Commissioner of Patents, Washington, D. C."